(No Model.) 8 Sheets—Sheet 1.
G. M. PETERS.
CARTRIDGE LOADING MACHINE.
No. 555,734. Patented Mar. 3, 1896.
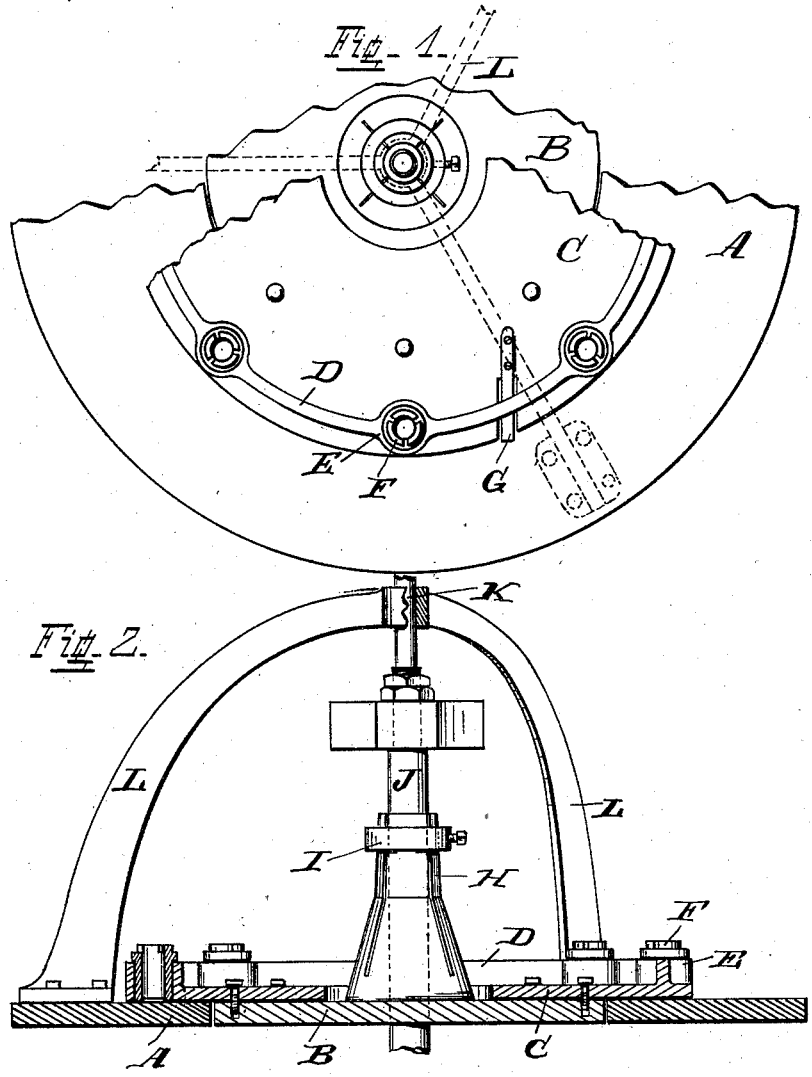
Attest
Rowland Croft
Edmund Hovey
Inventor
G. Moor Peters
By J. H. MacDonald Atty.

(No Model.) 8 Sheets—Sheet 2.
G. M. PETERS.
CARTRIDGE LOADING MACHINE.
No. 555,734. Patented Mar. 3, 1896.
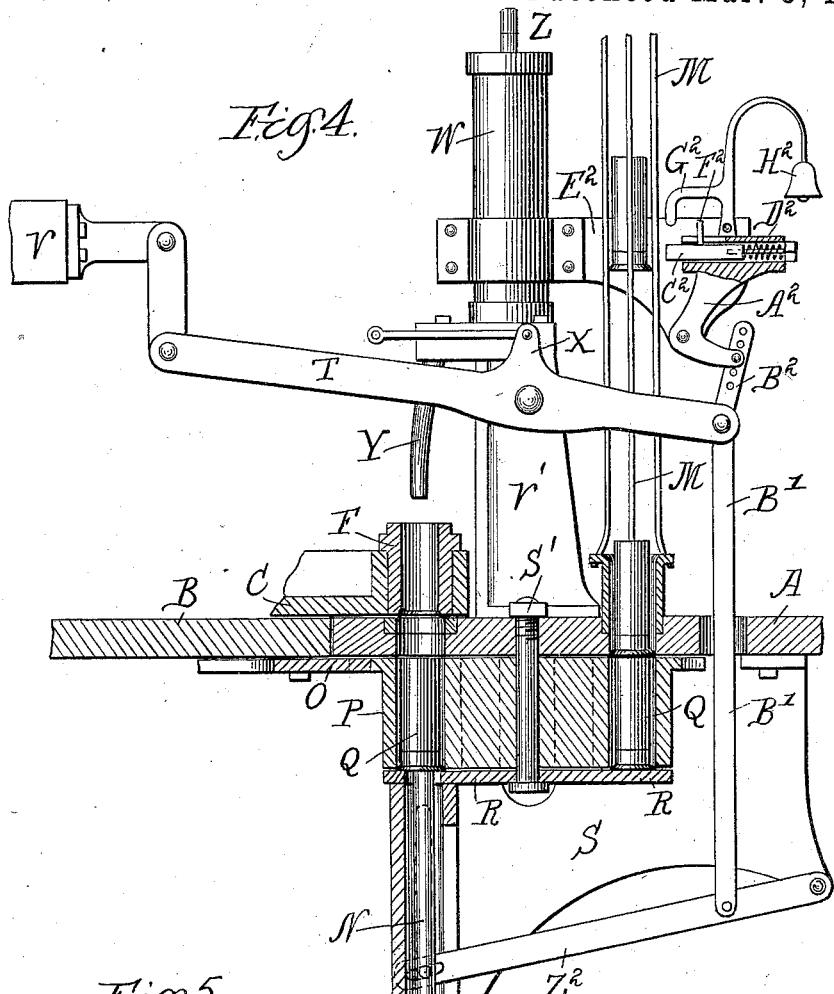
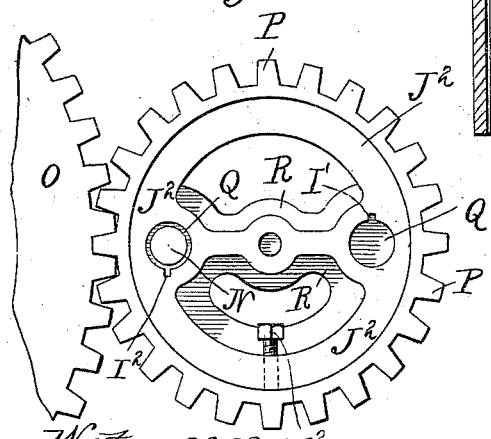
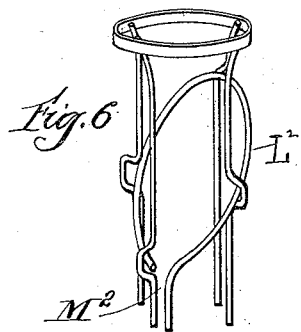
Witnesses.
Wm. M. Rheem.
Wm. J. Heming.
Inventor
Gershom Moore Peters
by Brown & Darby
Atty's

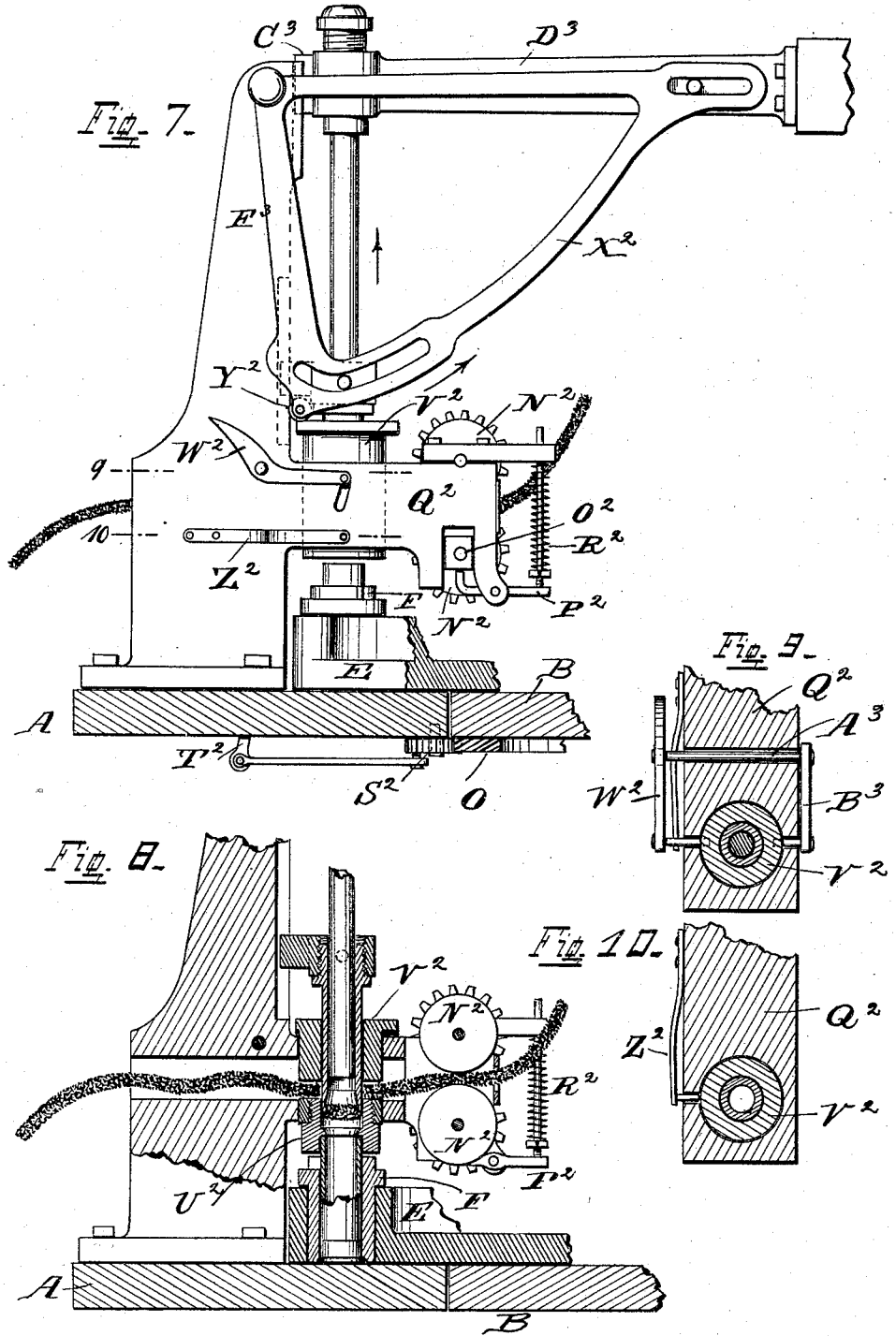

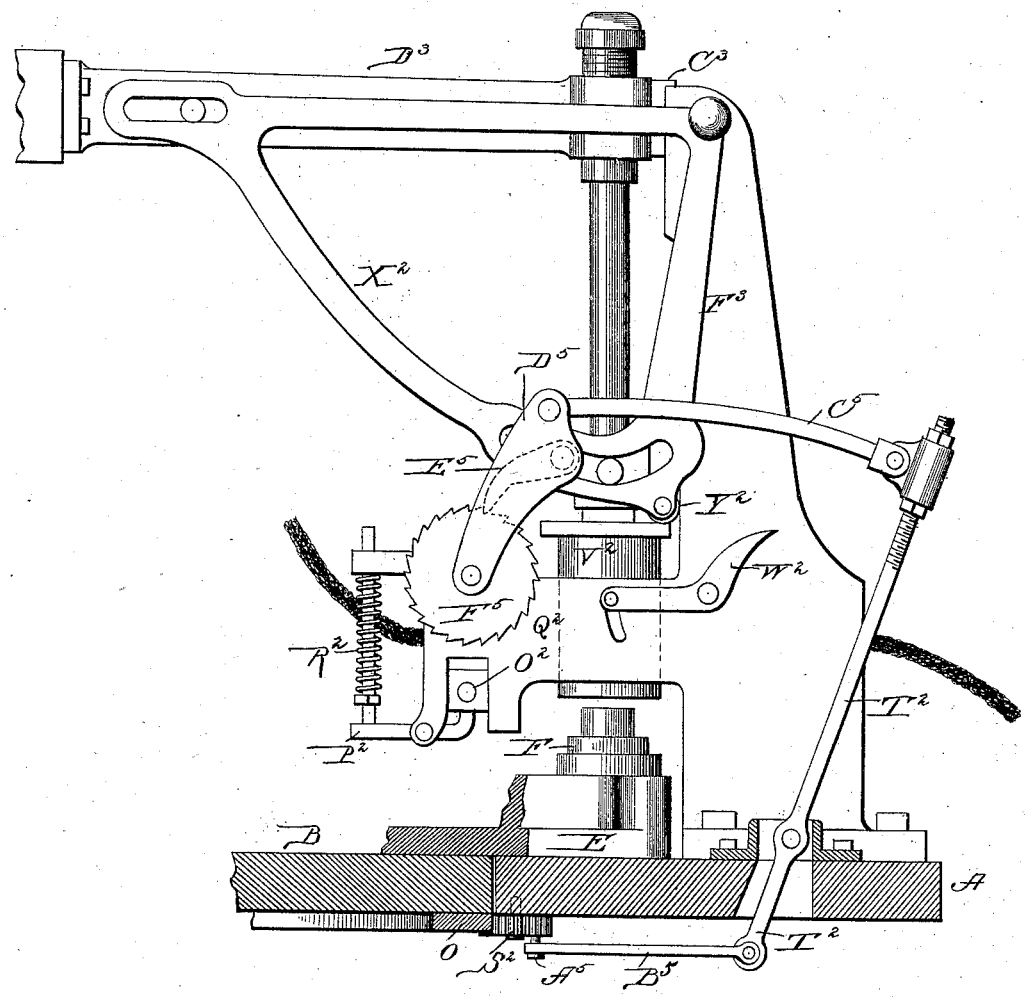

(No Model.) 8 Sheets—Sheet 5.
G. M. PETERS.
CARTRIDGE LOADING MACHINE.
No. 555,734. Patented Mar. 3, 1896.
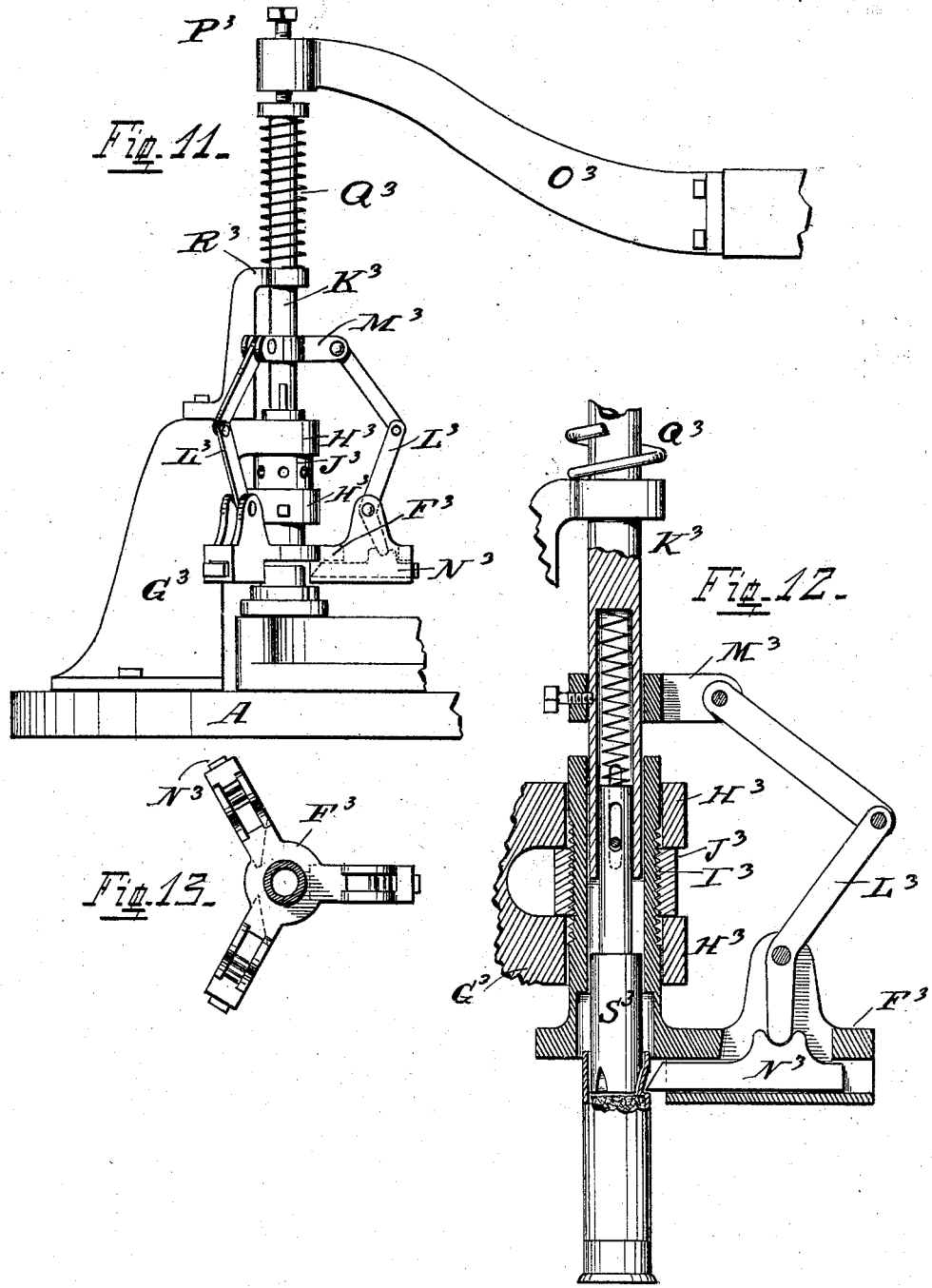

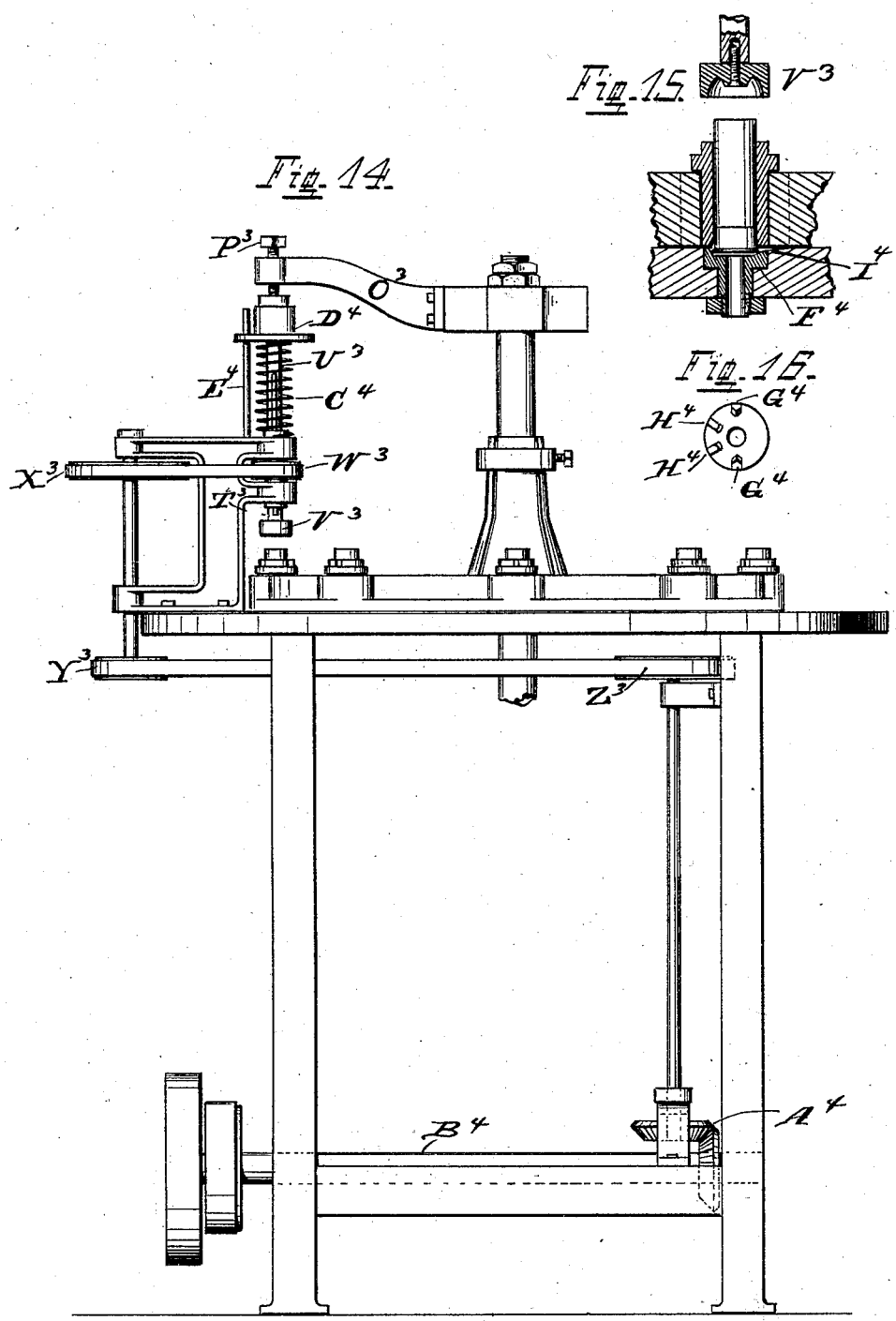

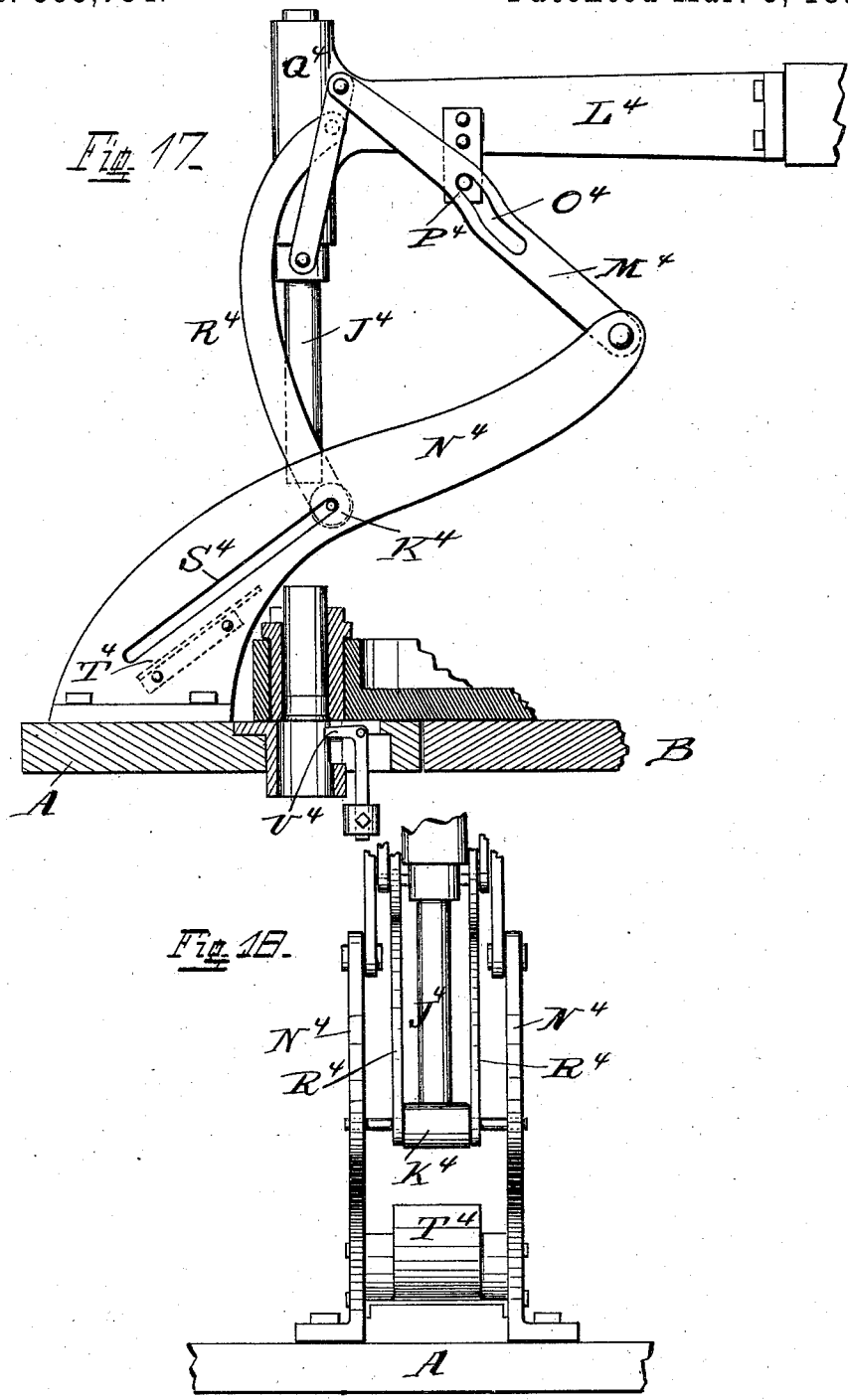

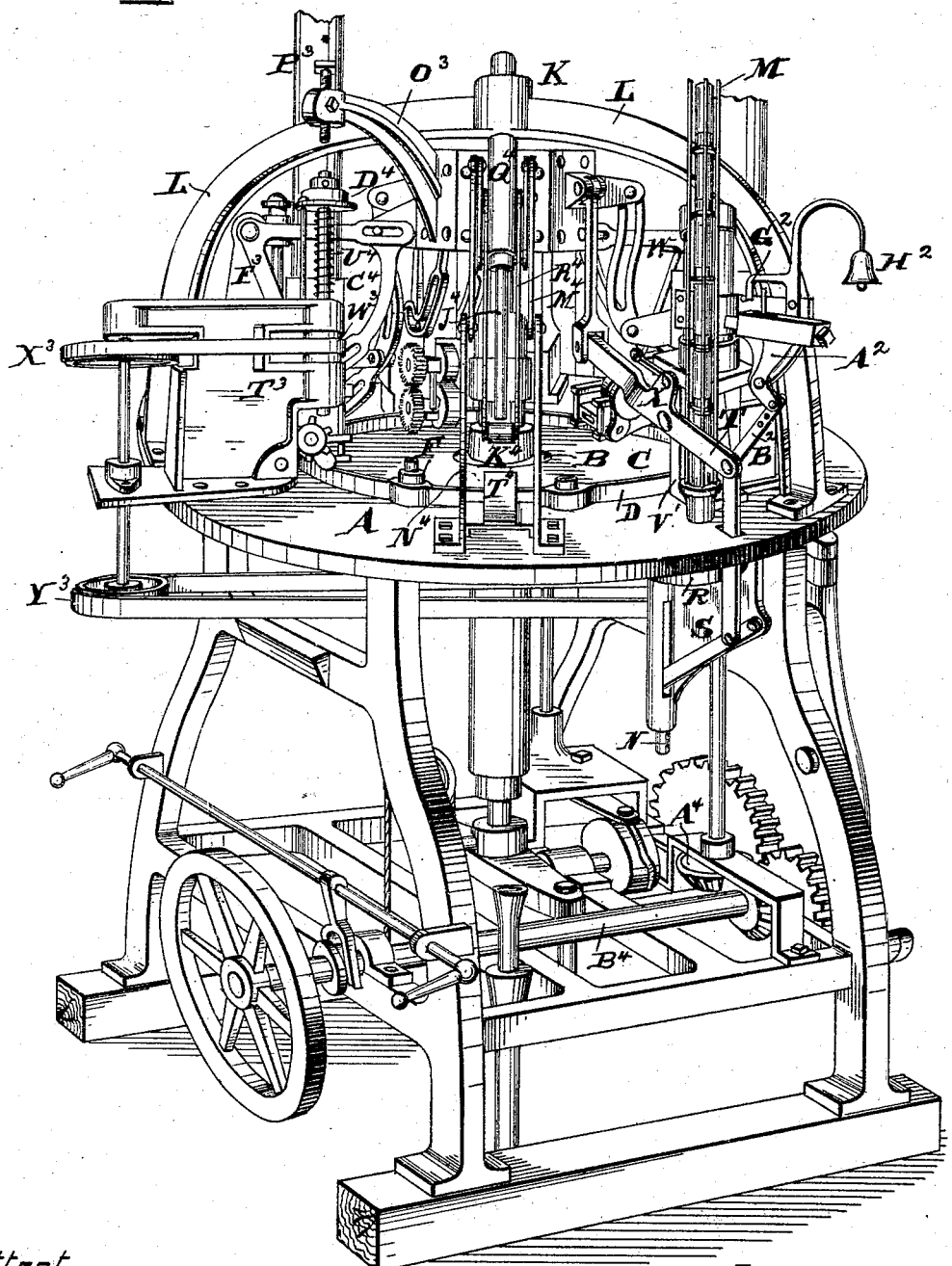

UNITED STATES PATENT OFFICE.

GERSHOM MOORE PETERS, OF CINCINNATI, OHIO.

CARTRIDGE-LOADING MACHINE.

SPECIFICATION forming part of Letters Patent No. 555,734, dated March 3, 1896.

Application filed September 28, 1889. Serial No. 325,358. (No model.)

*To all whom it may concern:*

Be it known that I, GERSHOM MOORE PETERS, a citizen of the United States, residing at Cincinnati, in the county of Hamilton and State of Ohio, have invented certain new and useful Improvements in Cartridge-Loading Machines; and I do hereby declare the following to be a full, clear, and exact description of the invention, such as will enable others skilled in the art to which it appertains to make and use the same.

My invention relates to cartridge-loading machines; and it consists in the construction and arrangement substantially as will be described in the specification and pointed out in the claims and illustrated in the accompanying drawings, in which—

Figure 1 is a top view of a part of the table with the filling devices removed. Fig. 2 is a vertical section of the same; Fig. 3, a detail side view of same; Fig. 4, a side elevation, partly in section, of the shell-placer and connecting parts; Fig. 5, a top view of the shell-placing wheel and a portion of the gear for rotating such wheel; Fig. 6, a detail view of the upper portion of the shell-cage; Fig. 7, a side elevation of the wad cutter and placer. Fig. 7ª is a side elevation of the wad cutting and feeding mechanism and the devices for operating the same, the view being taken from the side opposite to that illustrated in Fig. 7; Fig. 8, a vertical section, and Figs. 9 and 10 detail sections, of parts of same; Fig. 11, a side elevation of the shell-indenting mechanism; Fig. 12, a vertical section of same; and Fig. 13 is a plan view of the frame carrying the indenting-points, but with the vertical tube in cross-section; Fig. 14, a side elevation of the crimping mechanism. Fig. 15 is a detail view in section of the crimping-cup, the shell-case, and holding-piece with the shell in position to be crimped; Fig. 16, a plan view of a portion of same; Fig. 17, a side elevation, partly in section, of the extractor; and Fig. 18, an end elevation of same. Fig. 19 is a perspective view of the machine.

The improvements embraced in this case may be conveniently applied to a machine of the general type of that illustrated in my previous patent, No. 398,650, it being understood, of course, that such changes must be made in the general type, as the mechanic finds necessary, in order to adapt the machine to the improvements hereinafter set forth, and the timing of the various movements must be made to correspond thereto.

The improvements will now be described with reference to the accompanying drawings.

As heretofore I use a stationary table A, on which are secured the various filling devices, and the revolving table B, carrying the shell-cases. To this latter table is bolted (or cast solid with it) a plate C. Cast on this plate is a circular rib D—say an inch high— and affording at equidistant points, as E, sockets for the shell-cases F, with which they are closely fitted and held in place by set-screws. Secured to plate C is a small brush G, which bears down on and brushes the stationary table A, and thus not only keeps the table free from grit, but prevents soiling the butts of the shells. There may be several of such brushes if found necessary. It will be observed that by having all the shell-cases on one piece and not bolted separately on the revolving table, as heretofore, they can be accurately spaced as to the center and once placed cannot get out of position. The boss is now cast on the revolving table and split, as at H, Fig. 2, and provided with an adjustable collar I for taking up the wear of the central shaft, J.

It has been found desirable in order to give a perfectly-steady movement to furnish the shaft J a bearing at the top, and this has been done by lengthening the shaft and giving it a bearing at K, which is supported by the curved three-legged framework L reaching down and bolted to the stationary table, so as not to interfere with any of the filling devices.

Underneath the revolving table B is bolted a rim of cogs or teeth O, and this rim of teeth meshes with the teeth of the shell-placer wheel P, which latter contains two or more pockets Q suitably placed and of sufficient depth and size to each receive a shell. Of course this shell-placing wheel may be of any suitable size desirable, provided the co-operating parts are of proportionate size and have the proper movement; but I have found it convenient to furnish the wheel with two pockets to receive the shells and make it of such diameter that it will be given one-half revolution by one movement of the revolving table, so that a pocket which has received a shell from the shell-guiding tube will, by this half-revolution of the shell-placing wheel, be carried around underneath the shell-case and by the same movement an empty pocket from which the shell has previously been forced into another shell-case will be carried back under the shell-guiding tube or cage so as to be in position to receive another shell. A circular projection or plate R carried by the supporting-frame S of the machine affords a bottom for the shell-placing wheel, upon which the shell rests while it is being conveyed from the cage to its position underneath the shell-case. This projection or plate R is, of course, stationary and has an opening slightly smaller than the head of the shell and in position just over the shell-placing plunger, which will be hereinafter more particularly described. This plate R also may be cut away for that portion of its surface opposite the part forming the path of the shell, so that after a shell has been carried into position under a shell-case and the pocket of the shell-placing wheel continues to revolve, (in order to be carried back to the position under the shell tube or cage,) all dirt may drop out of such pocket or be readily removed therefrom. After the shell has been carried into position under an empty shell-case, as is shown in Fig. 4 of the drawings, it must be pushed upward into such shell-case, and for that purpose I provide a plunger N, which by suitable mechanism is made to move vertically at the proper time and effect this end. In the drawings I have shown an arrangement of mechanism suitable for this purpose, which consists in a lever $Z^2$, pivoted at one end to the shell-placing plunger N, and at the other end to the frame of the machine and intermediately of its ends to a link B', which latter at its opposite end is pivoted to a lever T fulcrumed on the frame, and said lever T is suitably connected to the reciprocating block V. This block or crosshead V is, in the machine illustrated in the drawings, mounted upon the upper end of a central shaft J, which by any suitable power is given a vertical reciprocating movement.

It will be of course understood by those skilled in the art that the movement of the head-block V must be so timed with relation to the shell-placing plunger N and the connecting mechanism that the plunger effects that portion of its movement which carries it through the shell-placing wheel and down again below such wheel during the time that the wheel is at rest, and the timing of the gearing which rotates the shell-placing wheel must be so adjusted with reference to the other parts that said wheel will be at rest while the plunger is moving through it in either direction and will be revolving at a time when the plunger is not passing through one of its pockets. Furthermore, the revolving movement of the table must be timed with relation to the shell-placing wheel so as to also always present an empty shell-case over the pocket in the shell-placing wheel when the latter has been carried to a position underneath such table, and also present this empty shell-case and retain it in position until the shell-placing plunger has forced the shell into the shell-case and has receded out of the way of all rotating movement.

In the position of the parts shown in Fig. 4 of the drawings the empty shell-case on the revolving table is in position to receive the shell, and the shell-placing wheel has carried such shell in position underneath the shell-case and both these parts are at rest, and the shell-placing plunger has been lifted to a point just underneath the shell and is about to push the shell upward into the shell-case. As shown, the plunger has been given about one-half of its upper movement.

The shells are fed to the shell-placing wheel through a shell-delivery tube or case M, substantially as in my former patent. In the drawings three shells are shown above one another, the lowermost shell being in a pocket, another shell resting upon this lowermost shell, and a third shell having just entered the tube and being about to descend. Of course, in practice, a number of shells will preferably be in the tube at the same time. When the revolving shell-placing wheel begins its movement and carries a shell from underneath the shell-delivery tube, the other shells in this tube will be prevented from descending by means of the interior horizontal ledge $J^2$, which may be of suitable width to thus act as a cut-off and support for the shells while the wheel is revolving. This ledge is best shown in Fig. 5 of the drawings. In loading wood-powder cartridges it is desirable to first prime the shell with black powder in order to quicken the fire. For this purpose a receptacle W for such black powder is placed upon the standard V', and at the bottom of this receptacle there is a feed slide or valve similar to that in the powder-hopper set forth in my former patent before referred to, and this slide is connected with an upward arm or projection X on the lever T. As the lever rocks up and down, the slide is moved in and out, and as the piston N is thrust up the slide is simultaneously moved out, and the charge of powder delivered through the spout Y into the shell just as it is thrust up into the case F.

In order to indicate at any time how much powder is in receptacle W a float is placed on the powder with a graduated blade Z extending up through the cover, which thus shows when the receptacle is to be replenished.

In order that the shells may be properly presented it is necessary that they descend in the cage M butts foremost. To avoid the possibility of a mistake a detector, as $A^2$, is provided, which is a bell-crank lever supported by a frame attached to the receptacle W, or otherwise, as may be found convenient. The lower end of this lever has an adjustable link connection $B^2$ with the lever T and is operated by it. The upper part of $A^2$ has a socket with piston $C^2$ pressing against an adjustable spring $D^2$. With every movement of lever T the piston $C^2$ is pressed against the butt of a shell, which is held firm by the projection $E^2$ on the opposite side, the piston being so adjusted as to give back on the spring $D^2$. When by chance the open end of the shell comes first the piston gets the full length of movement, which causes the pin $F^2$ to strike the projection $G^2$ and ring the alarm-bell $H^2$ on the outer end and thus attract the attention of the operator.

The pockets Q (before referred to) are provided with grooves $I^2$ to permit the entrance of the pin on pin-fire cartridges, which are so situated as to properly guide them into the case, which has a slight groove cut into the bottom and on the rear side to receive the pin.

The wheel P has a detachable wheel $J^2$ secured to it and adjusted by the screw $K^2$ in order that any wear or inaccuracy in the gearing of O and P may be taken up and the pockets Q always be brought directly under the case F. It will be observed that if the two gears O and P have their teeth inaccurately placed or themselves are inaccurately set, or after continued use the teeth wear to an extent which will allow too much play, that the pockets or recesses may not in operation fall directly under the shell-case F, and consequently the shells in such pockets cannot be forced into the shell-cases; but by having the rim which contains the pockets Q circumferentially adjustable with reference to the gear to which it is secured such rim may be partially revolved, so as to carry the pockets formed therein into a position in which they will fall directly under the shell-cases when the shell-placing wheel has been revolved for that purpose.

When loading with pin-fire cartridges the cage shown in Fig. 6 is used. The upper portion $L^2$ consists of a curved sloping wire, on which, as the pin strikes, it is guided and dropped through the slot $M^2$, thus always compelling the pin of the shell to enter the groove $I^2$ in the shell-placer. This result will be reached because the shell is made of about a diameter equal to the inside diameter of the guiding-cage shown in Fig. 6. The pin on such shell projects beyond the inside diameter of such cage, and consequently strikes inclined or curved sloping wire $L^2$, and is caused by the incline of such wire to be turned until its pin rests between the two wires $N^2$, and is thus forced directly into the groove $I^2$ in the shell-placer, which is then directly underneath.

In order to accommodate the feed-rolls $N^2$ to the varying thickness of the wad material, it is necessary to give them considerable spring movement. Hence instead of letting the bearing $O^2$ rest directly on a spring, as heretofore, it rests on a lever $P^2$, supported by the arm $Q^2$. This lever presses forward against the spring $R^2$, which, being longer, affords greater elasticity and spread for the rolls. The gearing-teeth in the rolls $N^2$ are correspondingly lengthened. The top roll is provided with a ratchet at one end, as is shown in Fig. 7$^a$. The cogged rim secured to the under side of the rotating table B meshes with a pinion $S^2$, which latter has a crank-pin $A^5$, said pin being connected by a link $B^5$ with the lever $T^2$, which in turn is connected by a link $C^5$ with pawl block or carrier $D^5$, to which is pivoted the pawl $E^5$, fitted to engage the teeth in the ratchet-wheel $F^5$, which is keyed to the shaft of the top roll $N^2$. As the rotating table B makes one move forward it causes the cogged pinion $S^2$ to make one entire revolution, which, by its crank-pin connection $A^5$, causes the link $B^5$ to move and thus correspondingly operate the lever $T^2$ and through link $C^5$, pawl $E^5$ and ratchet $F^5$ to turn the feed-roll $N^2$ and so draw forward the wad strip sufficient for another wad. At the same time the complete revolution of the pin $S^2$ causes the pawl to return to take a new hold of the ratchet.

Instead of using indenting-point to secure the top wad over the lower one it is by some deemed preferable that the shell shall be crimped by turning in the top of the shell. To do this it is necessary to have the top of the shell exposed and the surrounding case must be cut down, yet the top of the shell must be protected while the wads are being entered. Such a shell-case F is shown in Figs. 7 and 8 and it is fitted into the socket E, leaving, as shown, the top of the shell exposed.

The manner of protecting the top of the shell and guiding the wads is more fully shown in Fig. 8. The die $U^2$ is secured into and is preferably a part of the socket $V^2$, which has openings on opposite sides for the wad strip to pass through. The die has a lower cap-like extension, which fits down upon and around the shell while the wad is being entered, and has interiorly a beveled surface for contracting and guiding the wad into the shell. It is evident that this die must be lifted up before the shell is moved away and remain up until the next shell is brought in place. The socket $V^2$, which furnishes bearing for the tubular cutter and to which the die is attached, is movable up and down in its bearings. In Fig. 7 it is shown as up. As the cutter descends upon the wad strip and in the act of cutting the wad the socket $V^2$ is carried with it until the shoulder of the socket rests upon the supporting-arms $Q^2$. This brings the die $U^2$ over the top of the shell, where it remains for protection until the wad has passed into the shell. Connected with the socket $V^2$ and capable of operating it in its up-and-down movement is the lever $W^2$, which is curved upward at its rear end. This upturned portion is struck by the cam-lever $X^2$ at the point $Y^2$ just as the wad enters the shell, thus throwing up the socket and lifting the die from off the top of the shell. The socket $V^2$ fits snugly in its bearings, so that it will not fall of its own weight. As a precaution, however, against its falling before it is forced down a friction-bearing is provided and tension given to it by the spring $Z^2$. In Fig. 9 the connecting parts of said lever $W^2$ are shown. The pivot $A^3$ is a small shaft passing through the supporting-arm $Q^2$ and taking hold of a secondary lever $B^3$ on the opposite side which also connects with the socket $V^2$, thus evenly distributing the lifting power.

Fig. 10 shows the manner in which the spring $Z^2$ operates as a friction-bearing against the weight of the socket $V^2$.

Referring again to Fig. 7, $C^3$ is a projection on the end of the arm $D^3$, sliding in a groove cut in the standard $E^3$, thus preventing any lateral movement from the direct line as the rammer descends.

The indenting device heretofore used has also been simplified, as shown in Figs. 11, 12, and 13. Heretofore the frame $F^3$, supporting the bearings for the indenters, has been lifted and lowered with the rammer portion of the device. It is now proposed to make this portion stationary and at the same time adjustable to the various loads. A standard $G^3$ has two projections $H^3$, affording support and bearings for the frame $F^3$. The shaft portion of said frame has cut midway along its length a screw-thread $I^3$. Between the projections $H^3$ is placed a nut $J^3$, working in this screw-threaded portion of frame $F^3$ and serving to adjust it up and down, as may be required for the various loads. As the arms affording bearings for the indenters come down along the side of the shell and so remain, they must be cut away sufficiently for the shell to pass between. The rammer $K^3$, by its up-and-down movement, is required to throw the indenters in and out, and this is done by means of levers $L^3$, connected by links to the lug-piece $M^3$ on the rammer $K^3$. Thus by a knee-joint movement the levers $L^3$ by means of their connection at their lower end cause the indenters $N^3$ to be thrown in and out similar to what has formerly been shown. The rammer $K^3$ is pressed down by means of the arm $O^3$, coming in contact with it by means of the screw $P^3$, made adjustable to suit the various loads. The rammer is thrown up by means of the coil-spring $Q^3$, pressing against the collar $R^3$, provided for it. The rammer is practically composed of two parts $K^3$ and $S^3$. The portion $S^3$, with its depressions for receiving the indenting-points and forming the indentations, must remain stationary while the indenting-points are entering, and at the same time the upper portion, $K^3$, must keep moving in order to throw in the points. To accomplish this, $K^3$ is hollowed out and $S^3$ is made to telescope back into it as it comes in contact with the load in the shell, there being a strong coil-spring inside of $K^3$, Fig. 12, to keep it at other times extended at full length.

Sometimes gunners desire wads crimped in the ordinary way—i. e., the top of the shell bent in and rounded over the wad. I have provided such a crimper, which can be attached to the machine here shown, and which obviates the necessity of building separate machines for loading and crimping. When it is desired to thus crimp the shells, the indenting device is unscrewed from the stationary table and the frame $T^3$, Fig. 14, is screwed on in its place. This frame is provided with a shaft $U^3$, on the lower end of which is a crimping-cup or disk $V^3$, hollowed out and grooved substantially as shown in Fig. 15, which is a section showing the downward projecting portion of the interior of the cup and the manner of fastening it to the shaft $U^3$. This shaft is revolved with great speed by means of the pulley and belt connections $W^3$, $X^3$, $Y^3$, and $Z^3$, which are driven in turn by means of the miter-gearing $A^4$, connected with the general driving-shaft $B^4$. The same arm $O^3$ and adjustable screw $P^3$ used on the indenting device is here used for pressing the crimper down upon the shell, and the crimper is likewise thrown up by means of a coil-spring $C^4$. The collar $D^4$ is kept stationary by means of the upwardly-extending rod or pin $E^4$, the shaft $U^3$ revolving inside of it. Thus the collar is kept from wearing the spring.

To hold the shell while being crimped a piece $F^4$, Fig. 15, is set in the stationary table and underneath the point where the shell stands while being crimped. This piece has a depression preferably armed with slanting knife-like projections $G^4$, Fig. 16. As the shell is pressed down by the crimper it forces the butt against the knife-edges, which sufficiently cut into the butt to hold it firm against the crimper. The holder F, Fig. 15, is also provided with points $H^4$, which project into the depression and serve to hold the shell above said depression until it gets fairly over the sharp projections. The forward side of this holder may be made with a slanting or inclined surface, so that after the crimping is completed and it is desired to remove the shell from the holder, the rotation of the table will cause such shell to rise up the inclined surface and thus be lifted off the sharp-pointed projections.

The particular construction of the crimper mechanism will not be claimed here, for that is covered by my claims in the division of this case, Serial No. 401,292, which resulted in Patent No. 540,221, granted May 28, 1895. I have shown and generally described a crimper in the present application only because I make claim to the arrangement for converting the machine from an indenter to a crimper at will, and operating either of such devices in connection with the other features of the machine without changing the same in other respects.

I have also devised a new shell-extractor and inking device, as shown in Figs. 17 and 18. The extracting-rod $J^4$ is provided with a die on its lower end, which comes in contact with an inking-roller, as in my former patents. The arm $L^4$ has an up-and-down movement of five inches; but this is not enough to enable the extracting-rod to push the shell out of the case at all times. Therefore there must be a compounding of leverage that will enable the arm $L^4$ to give to the extracting-rod a movement of some seven or eight inches. This is accomplished by means of the lever $M^4$ pivoted to the standard $N^4$ bolted to the stationary table. Midway in the lever $M^4$ is a slot $O^4$ curved in its upper portion. In this slot works a pin or roller $P^4$, connected with the arm $L^4$. The lever $M^4$ is connected by link with the rod $J^4$, which rod has bearings in the head or socket $Q^4$. As the arm $L^4$ moves downward the pin $P^4$ slides along the curved portion of the slot $O^4$, which is so shaped that it will hold $J^4$ exactly in its place and give it the same movement as that of $L^4$ during the first half of its stroke. When $P^4$ reaches the straight portion of the slot $O^4$, rod $J^4$ is greatly accelerated and its stroke lengthened sufficient to extract any shell. The roller $K^4$ is pivoted in swinging arms $R^4$, which in turn are pivoted to the arm $L^4$ and have a movement with it. The shaft of the roller $K^4$ extends outward at either end and plays in the inclined slots $S^4$ in standard-blades $N^4$, so that as $L^4$ moves downward the roller is pushed out of the way of the extracting-rod, and as it moves upward the roller is carried over the die, thus inking it for printing the designation on the next cartridge. There is an inking-pad $T^4$ so arranged that with each move of the roller along the slot $S^4$ it passes over this pad, thus keeping the surface of roller properly inked. This action will be more readily observed by reference to Fig. 18.

In order to prevent the shell from dropping by its own weight when it is carried to the opening in the table, a catch $U^4$, Fig. 17, having a counterbalancing-weight, is pivoted beneath the table and holds the shell. As rod $J^4$ descends it acts against the weight, thus giving a resistance enough to permit the die to properly print the designation on the upper wad as the shell is being ejected.

Having thus described my invention, what I claim, and desire to secure by Letters Patent, is—

1. In a machine for loading cartridges, and in combination with the actuating mechanism thereof, a rotating shell-placer operated thereby whereby the cartridge-shells are successively transferred from said placer to the shell-carrier; substantially as described.

2. In a machine for loading cartridges, the combination, with a shell-carrier of a rotating shell-placer provided with cells for the ingress and egress of shells therefrom substantially as described.

3. In a machine for loading cartridges, the combination with the shell-carrier shell-feeding tube, and a vertically-reciprocated rod, of a rotating shell-placer provided with cells or holes for the ingress and egress of shells therefrom, substantially as described.

4. In a machine for loading cartridges, the combination, with the shell-carrier, shell-feeding tube, and a vertically-reciprocated rod, of a horizontally-rotating shell-placer provided with cells, and means for revolving the same, substantially as described.

5. In a cartridge-loading machine the combination of a rotating table having shell-cases, of a revolving shell-placer, and gearing connecting such parts; substantially as and for the purpose set forth.

6. In a cartridge-loading machine the combination of a rotating table provided with shell-cases and a cogged rim secured to such table, with a shell-placing wheel geared to revolve with such rim and having pockets for the shells; whereby the shells are suitably fed to the cases in the rotating table; substantially as and for the purpose set forth.

7. In a machine for loading cartridges the combination with the actuating mechanism of a shell-carrier provided with cells and teeth upon its periphery, and a shell-placer also provided with cells and teeth meshing with the teeth of the shell-carrier; substantially as and for the purpose set forth.

8. In a machine for loading cartridges, the combination with, a rotating shell-placer, shell-carrier, tool-carrier, shell-feeding and delivery tubes, and an ejector, substantially as described.

9. In a cartridge-loading machine a movable shell-carrying device provided with a groove for the reception of the pin of a pin-fire shell; substantially as and for the purpose set forth.

10. In a cartridge-loading machine the combination of a supplemental powder-receptacle, with mechanism for inserting the shell into the case, and connections between the same and the slide of the powder-feed; whereby the shell is automatically primed as it is placed in the case; substantially as shown and described.

11. In a cartridge-loading machine the combination with an alarm device, such as a bell, of a reciprocating yielding plunger, arranged to engage and operate the alarm when given its full stroke, but normally to be stopped short of such full stroke by contact with the rim of the butt of the shell; substantially as and for the purpose set forth.

12. In a cartridge-loading machine, a shell-cage provided with a curved guide terminating in a narrow approximately-vertical guideway; whereby a pin-fire type of shell is properly guided in its passage to the shell-placer, substantially as shown and described.

13. In a cartridge-loading machine the combination of a wad-rammer, a wad-cutter, and an independently-movable die extending beyond the stroke of the cutter; substantially as and for the purpose set forth.

14. In a cartridge-loading machine the combination with a shell-case of less length than the shell, a wad-cutter, a wad-rammer and an independently-movable die; substantially as and for the purpose set forth.

15. In a cartridge-loading machine the combination of a shell-case of less length than the shell, a wad-cutter and an independently-movable die extending below the stroke of the cutter so as to surround the end of the shell and guide the wad; substantially as and for the purpose set forth.

16. In a cartridge-loading machine the combination of a shell-case, of less length than the shell, a wad-cutter, and an independently-movable die; substantially as and for the purpose set forth.

17. In a cartridge-loading machine the combination with the final wad-placer of indenting mechanism and vertically-adjustable supports for the indenting mechanism, substantially as and for the purpose set forth.

18. In a cartridge-loading machine the combination with a main actuating mechanism of indenting mechanism, supports for the indenting mechanism and devices carried by the frame of the machine for adjusting vertically the supports for the indenting mechanism, and consequently regulating the vertical position of the latter with reference to the shell; substantially as and for the purpose set forth.

19. In a cartridge-loading machine, the combination with the main actuating mechanism a rammer consisting of two parts movable one within the other and disconnected from the main actuating mechanism but actuated thereby, and an adjusting device for adjusting the stroke of the actuating mechanism with reference to the rammer; substantially as and for the purpose set forth.

20. In a cartridge-loading machine the combination with the main actuating mechanism of a stationary table and bracket for carrying the indenter or crimper removably secured to such table; substantially as and for the purpose set forth.

21. In a cartridge-loading machine, a rammer, composed of two parts yieldingly connected to each other, and adapted to be depressed by the cross-head, in combination with a stationary frame for the indenter-points, and connections between such points and the upper part of the rammer; substantially as and for the purpose set forth.

22. The combination with a vertically-moving actuating mechanism, of an extractor-rod operated thereby a lever pivoted at one end to the vertically-moving mechanism and its other end guided in an angularly-disposed bracket and carrying an inking-roller; substantially as and for the purpose set forth.

23. In a cartridge-loading machine the combination of a vertically-moving actuating mechanism, an extracting-rod operated thereby, with a system of compound levers connected to the rod, to a stationary part of the machine and to the actuating mechanism; whereby the rod receives an additional throw from such system of levers, substantially as shown and described.

24. In a cartridge-loading machine the combination of a vertically-moving actuating mechanism, an extractor-rod operated thereby, an inclined bracket, a system of compound levers connected to the rod to the bracket and and to the actuating mechanism, one of such levers containing a cam-slot, and a pin projecting from the actuating mechanism and playing in such slot; substantially as and for the purpose set forth.

In testimony whereof I affix my signature in presence of two witnesses.

G. MOORE PETERS.

Witnesses:
F. C. TUTTLE,
A. M. BEEKLEY.